(12) United States Patent
Juurinen (10) Patent No.: US 11,181,223 B2
(45) Date of Patent: Nov. 23, 2021

(54) INSULATED PIPE

(71) Applicant: Uponor Innovation AB, Virsbo (SE)

(72) Inventor: Tero Juurinen, Virsbo (SE)

(73) Assignee: UPONOR INNOVATION AB, Virsbo (SE)

( * ) Notice: Subject to any disclaimer, the term of this patent is extended or adjusted under 35 U.S.C. 154(b) by 0 days.

(21) Appl. No.: 16/798,209

(22) Filed: Feb. 21, 2020

(65) Prior Publication Data

US 2020/0271264 A1 Aug. 27, 2020

(30) Foreign Application Priority Data

Feb. 22, 2019 (DE) .......................... 102019104585.1

(51) Int. Cl.

| | |
|---|---|
| *F16L 59/065* | (2006.01) |
| *F16L 59/02* | (2006.01) |
| *F16L 59/07* | (2006.01) |
| *F16L 59/14* | (2006.01) |
| *F16L 59/153* | (2006.01) |

(52) U.S. Cl.
CPC ........... *F16L 59/065* (2013.01); *F16L 59/029* (2013.01); *F16L 59/07* (2013.01); *F16L 59/143* (2013.01); *F16L 59/153* (2013.01)

(58) Field of Classification Search
CPC ....... F16L 59/065; F16L 59/029; F16L 59/07; F16L 59/143; F16L 59/153
USPC ......................................................... 138/149
See application file for complete search history.

(56) References Cited

U.S. PATENT DOCUMENTS

| | | | | |
|---|---|---|---|---|
| 4,194,536 | A * | 3/1980 | Stine ........................ | H05B 3/58 138/149 |
| 5,142,842 | A * | 9/1992 | Schirmer ................ | B32B 15/20 53/427 |
| 5,943,876 | A * | 8/1999 | Meyer ..................... | F28D 20/02 62/371 |
| 7,334,375 | B2 * | 2/2008 | Di Gregorio ........... | E04B 1/803 52/409 |
| 7,631,668 | B2 * | 12/2009 | Rantalainen .......... | F16L 59/143 138/149 |
| 9,261,206 | B2 * | 2/2016 | Soika ....................... | F16L 11/15 |
| 9,862,127 | B2 * | 1/2018 | Bronnum ............ | B29C 48/0019 |
| 10,830,385 | B2 * | 11/2020 | Parks ...................... | F16L 59/14 |

(Continued)

FOREIGN PATENT DOCUMENTS

| | | |
|---|---|---|
| EP | 1926931 B1 | 12/2009 |
| EP | 1483099 B1 | 5/2013 |

(Continued)

OTHER PUBLICATIONS

EP 20153846.9—Extended EP Search Report dated Jun. 15, 2020, 10 pages.

*Primary Examiner* — Craig M Schneider
*Assistant Examiner* — David R Deal
(74) *Attorney, Agent, or Firm* — Ernest Beffel, Jr.; Andrew L. Dunlap; Haynes Beffel & Wolfeld LLP (57) ABSTRACT

The present invention provides an insulated pipe comprising one or more inner pipes comprising a plastic, a flexible vacuum insulation panel in the form of units joined to each other wrapped around at least one of the one or more inner pipes, one or more insulation layers, and an outer jacket. The present invention further provides a method and an apparatus for producing the insulated pipe.

14 Claims, 5 Drawing Sheets

DETAIL A (56) References Cited

U.S. PATENT DOCUMENTS

| | | | | |
|---|---|---|---|---|
| 2004/0134556 A1* | 7/2004 | Manini | ............... | F16L 59/065 |
| | | | | 138/149 |
| 2005/0121093 A1* | 6/2005 | Rantalainen | .......... | F16L 59/143 |
| | | | | 138/121 |
| 2010/0170590 A1* | 7/2010 | Juuti | ................ | B29C 48/11 |
| | | | | 138/121 |
| 2017/0368724 A1* | 12/2017 | Mack | ................ | B32B 5/30 |

FOREIGN PATENT DOCUMENTS

| | | |
|---|---|---|
| EP | 3354559 A1 | 8/2018 |
| EP | 3354959 A1 | 8/2018 |
| WO | 95/00797 A1 | 1/1995 |
| WO | 2003/068481 A1 | 8/2003 |
| WO | 2014/183814 A1 | 11/2014 |
| WO | 2017/144609 A1 | 8/2017 |

* cited by examiner

DETAIL A

INSULATED PIPE

CROSS-REFERENCE

This application claims the benefit of and priority to German Application No. 102019104585.1 filed 22 Feb. 2019. The priority application is incorporated by reference herein.

DESCRIPTION

The present application relates to an insulated pipe, in particular to a vacuum insulated pipe for local heat distribution.

Modern solutions for local heat distribution need to meet the strictest requirements with regard to safety, reliability, robustness, and efficiency.

It is known to use pre-insulated pipes for distribution of warm drinking water or for heating supply networks in different building types, among them hotel complexes, industrial facilities and single family houses as well as multi storage buildings. Such pipes may be used to supply heat from the local boiler or a remote heating system.

Vacuum-insulated pipes are, for example, known from WO 95/00797 A1, WO 17144609, and EP 3354559.

The object of the present invention is to provide an insulated pipe having a very low thermal conductivity while being compact and flexible enough such that it can be coiled up.

This object has been achieved by providing an insulated pipe, a method, and an apparatus.

According to the first aspect of the present invention, an insulated pipe is provided comprising:
one or more inner pipes comprising a plastic
a vacuum insulation panel in the form of units forming a web wrapped around the at least one inner pipes
one or more insulation layers
an outer jacket.

The insulated pipe may comprise two or more inner pipes. In this case, each inner pipe may be surrounded by one web of vacuum insulation panels. Alternatively, only one of the inner pipes may be surrounded by one web of vacuum insulation panels.

The one or more inner pipes may be reinforced and thus may comprise a reinforcement material and a plastic. The reinforcement material can be inorganic or organic. For example, it is possible to use organic fibers as reinforcement material.

The one or more inner pipes may be multi-layer pipes, preferably comprising one or more diffusion barrier layers, such as an aluminum layer. Preferably, the diffusion barrier is made of a material comprising, preferably consisting of, selected from the group consisting of ethylene vinyl alcohol (EVOH), aluminium foil, and a combination thereof.

In a preferred embodiment, the one or more inner pipes consist of a plastic.

Preferably, the plastic is a polyolefine. The polyolefine used for the inner pipe is not limited. It is possible to use non-crosslinked polyolefines. Preferably, the non-cross linked polyolefines are selected from the group consisting of polyethylene, preferably PE-RT (Polyethylene of Raised Temperature resistance), polypropylene, preferable PPR (about 5% PE in the molecular chain of PP random uniform polymer (random copolymer), polybutylene terephthalate (PBT), and mixtures thereof. Alternatively, a cross-linked polyolefine can be used. An example for a cross-linked polyolefine is cross-linked polyethylene (PEX) which is preferably made from high density polyethylene (HDPE). PEX contains cross-linked bonds in the polymer structure, changing the thermoplastic to a thermoset. Cross-linking is accomplished during or after the extrusion of the tubing. The degree of cross-linking is preferably between 60 and 90%. A higher degree of cross-linking could result in brittleness and stress cracking of the material while a lower degree of cross-linking could result in an inner pipe with poorer physical properties. More preferably, the crosslinking degree is set in accordance with ASTM Standard F876 or ISO 15875. Cross-linked polyethylene (PEX) is the preferred material for the one or more inner pipes due to its material properties, in particular flexibility and high-temperature resistance.

Vacuum insulation panels (VIPs) are sheets comprising envelopes, in which insulating materials or inert fillers are completely encapsulated, and the envelope, which has maximum impermeability to gases, is very substantially evacuated. Very low gas diffusion values are needed for the envelope material so that once the vacuum has been applied it is retained for the maximum time.

In accordance with the present invention, the VIP-panels are produced as short units. These units are then joined to each other for producing a long set of panels, also referred to as "a vacuum insulation panel in the form of units forming a web", which can be wrapped around the pipe. The jointing of the panel units may be done by securing the panel ends together, preferably by using a method selected from the group consisting of sewing, gluing, laminating or taping and a combination thereof. The VIP may comprise prepressed silica. Preferably, the core of the vacuum insulation panel comprises a powdery material, such as powder of inorganic oxides. Processes for producing such VIPs having a core comprising powdery material are known, for example, from WO 2014/183814 A1. The VIP preferably has a thickness from 5 to 40 mm, more preferably 5 to 35 mm, most preferred 8 to 30 mm. The U-value of the VIP is preferably below 0.3 W/(m2K), more preferably below 0.25 W/(m2K).

In a preferred embodiment, at least one of the sides of the envelope of the VIP has grooves for enhancing the flexibility. These groves can, for example, be formed by embossing the prefilled envelope on a mold in a vacuum oven. These groves preferably do not penetrate the insulation in order to prevent a thermal bridge effect. The number and arrangement of the grooves is not limited. Preferably, the grooves are arranged regularly. More preferably, the grooves are arranged such that they form grooves in the direction of the greatest length of the VIP. In particular, the space between the grooves is between 0.5 and 5 cm, more preferably between 1 and 4 cm, in particular between 1 and 3 cm.

The width of the web of VIP-panels is preferably about the same as the pipe circumference, so that one web of VIP-panels surrounds the inner pipe. For example, the width can be 300-1300 mm. There can be a gap between the VIP-panels of the web, but preferably the panels overlap.

In a preferred embodiment, the insulated pipe further comprises a diffusion barrier between the one or more inner pipes and the flexible vacuum insulation panel. The diffusion barrier is preferably resistant to humidity. For example, an aluminum foil can be used for the diffusion barrier. Alternatively or in addition, a layer of ethylene vinyl alcohol (EVOH), which is a formal copolymer of ethylene and vinyl alcohol, can be used as the diffusion barrier. The EVOH-layer prevents oxygen from entering the fluids inside the pipe and thus potentially causing corrosion on radiators. It is possible to extrude the diffusion barrier on the inner pipe. Alternatively or in addition, it is possible to wrap the VIP in a diffusion barrier, for example an aluminum foil. The wrapping of the VIP in the diffusion barrier improves the aging properties of the VIP. Preferably, the diffusion barrier is made of a material comprising, preferably consisting of, selected from the group consisting of ethylene vinyl alcohol (EVOH), aluminium foil, and a combination thereof.

As the material for the outer jacket, the same plastic as specified above for the one or more inner pipes can be used. Preferably, the outer jacket is corrugated. The corrugation enhances the ring stiffness of the piping element.

The insulated pipe further comprises one or more, preferably foamed, insulation layers beneath the outer jacket. The insulation layer may be made of polyethylene (PE), cross-linked polyethylene (PEX), polypropylene (PP), polyurethane (PUR) or aerogel. Preferably, they are made of, preferably cross-linked, polyethylene foam or polyurethane. They are most preferably made of cross-linked closed-cell polyethylene foam. In view of a diminished brittleness, cross-linked or non-cross-linked polyethylene foam is preferred. This flexible layer ensures that the temperature of the VIP will not be too high during the processing of the outer jacket and also provides for mechanical protection of the VIP. More specifically, the flexible layer provides for thermal insulation/mechanical protection of the VIP panel during processing (i.e. the high temperatures that the VIP will be exposed to when the outer plastic layer is extruded on the outside of the pipe). This enables continuous production of pipe. Another function is mechanical protection of the VIP and and thermal insulation. Moreover, the PEX-foam has a lower humidity uptake than the PE-foam.

The insulated pipe may further comprise one or more spacer between the vacuum insulation panel and the outer jacket, preferably made of a foamed polymer.

Preferably, the core of the vacuum insulation panel comprises inorganic oxides in the form of a powder, preferably silica powder, more preferably fumed silica powder. Such a powder of inorganic oxides is preferred because it improves the flexibility of the VIP, particularly in comparison to prepressed silica. Silica is preferred as it is more resistant to ageing (i.e. a pressure increase due to the in-diffusion of gasses increases the lamba at a slower rate for the silica powder due to its nano-structure). In addition, silica has a small pore size and thus is not as pressure sensitive as, for example, glass fiber. Therefore, silica is suitable for long term applications, especially at elevated temperatures, when the diffusion is more rapid. Fumed silica, also known as pyrogenic silica because it is produced in a flame, consists of microscopic droplets of amorphous silica fused into branched, chainlike, three-dimensional secondary particles which then agglomerate into tertiary particles. The resulting powder has an extremely low bulk density and high surface area. Fumed silica is made from flame pyrolysis of silicon tetrachloride or from quartz sand vaporized in a 3000° C. electric arc. Major global producers are Evonik (Aerosil®), Cabot Corporation (Cab-O-Sil®), Wacker Chemie (HDK®), Dow Corning, and OCI (Konasil®). Fumed silica is particularly preferred because VIPs comprising fumed silica degrade about 100 times slower than glass fiber panels, and are therefore preferable for elevated temperature applications. For example, the core of the VIP can comprise fumed silica, IR opacifiers, and a small amount of organic fibers. The core material is preferably non-combustible. It is preferably sealed in a high gas barrier film and an extra glass fibre textile for mechanical shock protection.

Preferably, the vacuum insulation panel further comprises an outer shell made of an element selected from the group consisting of metallized foil, polyester or polyamide, and a combination thereof, preferably metallized foil. It is noted that aluminium foil contains—for the same area, 21 times more aluminum compared to metallized film. In addition, aluminum posseses a high heat conductivity. Thus, one would expect more heat bridges in the VIP comprising aluminum foil compared to the VIP comprising metallized foil, resulting in a lower lambda value of the VIP. Therefore, the metallized foil is preferred in view of the heat conductivity.

Preferably, the vacuum insulation panel comprises ethylene-vinylalcohol-copolymer layers inside the vacuum insulation panel. Such ethylene-vinylalcohol-copolymer layers are preferred in view of the aging characteristerics.

Preferably, the longitudinal ends of each of the one or more webs of vacuum insulation panels independently wrapped around at least one or more of the inner pipes are secured together, more preferably by using a method selected from the group consisting of sewing, gluing, laminating or taping and a combination thereof.

This may be achieved by arranging an adhesive or adhesive tape over at least the seam part of one side of the web of vacuum insulation panels and joining together the pipe surface and the web of vacuum insulation panels by using the adhesive or adhesive tape.

Preferably, the insulated pipe further comprises a fastening means made up of plastic film that is wound independently around at least one inner pipe outside the web of flexible vacuum insulation panels and inside of the one or more foamed insulation layers in the form of helical curve for preventing the longitudinal movement of each of the one or more inner pipes with respect to the web of flexible vacuum insulation panels.

Alternatively or in addition, in the event the insulated pipe comprises two or more inner pipes, the insulated pipe may further comprise a fastening means made up of plastic film that is wound around both inner pipes outside the web of flexible vacuum insulation panels and inside of the one or more foamed insulation layers in the form of helical curve and arranged to surround both of the inner pipes together for preventing the longitudinal movement of the inner pipes with respect to each other.

In a second aspect of the present invention, a method for manufacturing the insulated pipe according to the first aspect of the present invention is provided comprising winding plastic film, thus producing a fastening means made up of plastic film, independently around at least one or more of the inner pipes outside the web of flexible vacuum insulation panels and inside of the one or more foamed insulation layers in the form of helical curve for preventing the longitudinal movement of each of the one or more inner pipes with respect to the web of flexible vacuum insulation panels and/or, wherein the insulated pipe comprises two or more inner pipes, winding plastic film, thus producing a fastening means made up of plastic film around the two or more inner pipes outside the web of flexible vacuum insulation panels and inside of the one or more foamed insulation layers in the form of helical curve and arranging plastic film to surround the two or more inner pipes together for preventing the longitudinal movement of the inner pipes with respect to each other, arranging foamed insulation layers outside the plastic film beneath the outer jacket, and forming a, preferably corrugated, outer jacket outside the, preferably foamed, insulation layers.

Preferably, the one or more foamed insulation layers beneath the outer corrugated jacket are formed by wrapping an insulation sheet around the one or more inner pipes.

In a third aspect of the present invention, an apparatus for manufacturing an insulated pipe is provided, wherein the apparatus comprises means for feeding longitudinal components, whereby at least one of the longitudinal components is an inner pipe and one of the longitudinal components is a web of flexible vacuum insulation panels, which is arranged around one or more of the at least one inner pipes, means for arranging one or more, preferably foamed, insulation layers outside the longitudinal components, an extruder and a corrugator for forming a preferably corrugated, outer jacket outside the one or more, preferably foamed, insulation layers, and means for arranging fastening means made up of plastic film in the form of helical curve to the longitudinal components to touch each of the longitudinal components in such a manner that the fastening means prevent the longitudinal movement of the longitudinal components with respect to each other.

Preferably, the apparatus comprises a winding device for winding plastic film in the form of a helical curve independently around at least one inner pipe outside the web of flexible vacuum insulation panels and inside of the one or more foamed insulation layers in the form of helical curve for preventing the longitudinal movement of each of the one or more inner pipes with respect to the web of flexible vacuum insulation panels and/or, wherein the insulated pipe comprises two or more inner pipes, winding plastic film, thus producing a fastening means made up of plastic film, around two or more inner pipes outside the web of flexible vacuum insulation panels and inside of the one or more, preferably foamed, insulation layers in the form of helical curve and arranging the plastic film to surround the two or more of the inner pipes together for preventing the longitudinal movement of the inner pipes with respect to each other.

Preferrably, the apparatus comprises means for arranging a prefabricated insulator around the longitudinal components. More preferably, the means is a wrapping device for wrapping a prefabricated insulation sheet around the one or more inner pipes.

DETAILED DESCRIPTION OF EMBODIMENTS

Figure 1:
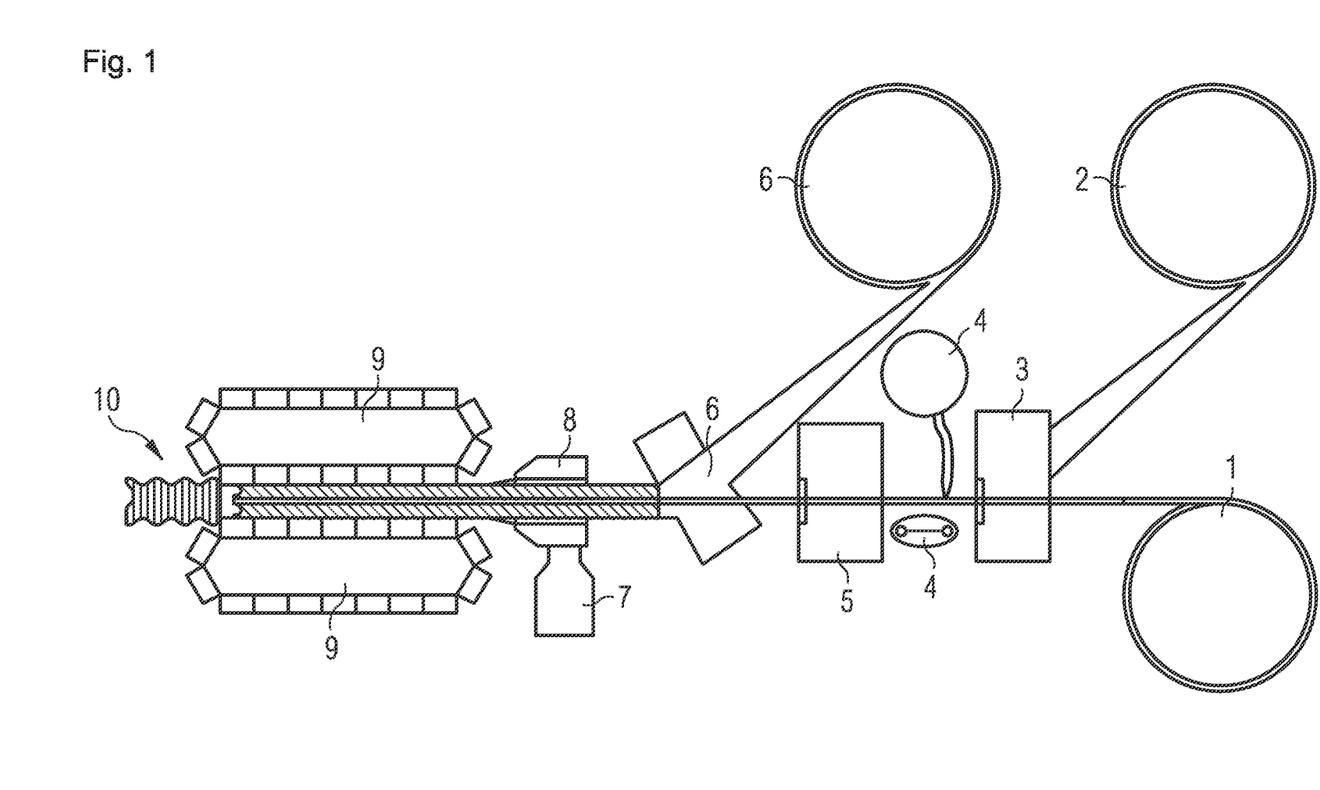
FIG. 1 shows an apparatus for producing an insulated pipe
Figure 2A:
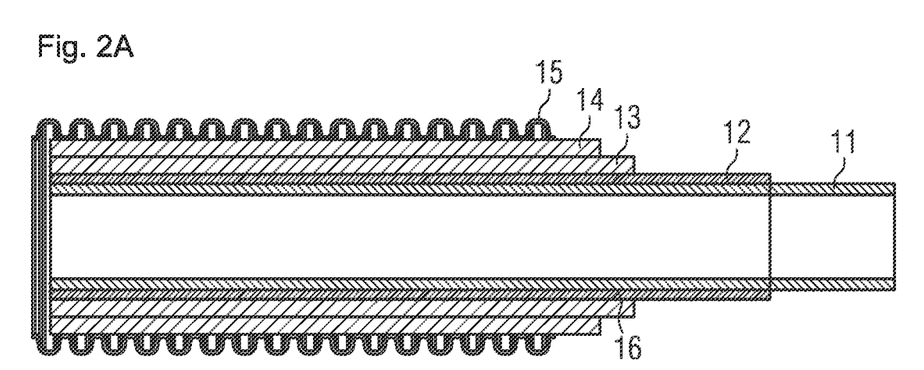
FIGS. 2A, 2B, 2C and 2D show different views of a piping element.

FIG. 1 shows an apparatus for manufacturing a piping element 10, wherein FIGS. 2A-2D show the individual layers of the piping element 10. The inner pipes 11 are manufactured in advance and wound into coils. The apparatus thus comprises means 1 for feeding the inner pipes 11 from the coils. Specifically, FIG. 2A shows a cutaway drawing of the piping element 10, wherein the piping element is cut through along the centerline. FIG. 2A shows the following individual layers: Inner pipe (11), web of VIP (12), Insulation layers (13, 14), outer jacket (15), wherein a foil 16 wound over the web of VIP is indicated as fat line.

Figure 2B:
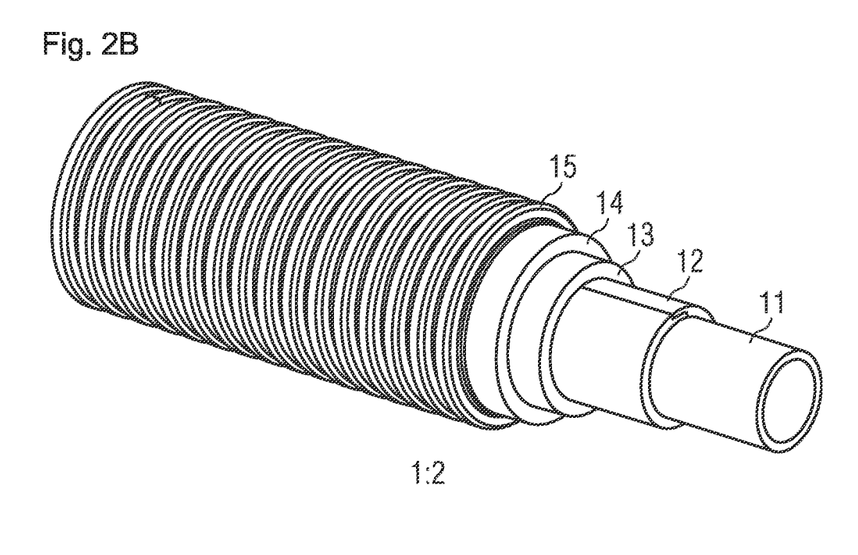

FIG. 2B shows a perspective view of the piping element 10, wherein the piping element 10 is cut through at the end and the individual layers (11) to (15) are elongated in a staggered way. The inner pipes 11 are fed through a winding device 3, in which a web of VIP 12 fed from means 2 is wound around the inner pipes 11. In means 4, foil 16 is wound over the web of VIP. Because the inner pipes 11 move continuously forward in the apparatus, i.e. to the left in FIG. 1, and the winding device 4 winds the plastic film roll around the inner pipes 11, the plastic film 16 settles on the web of VIP around the pipes 11 in the form of a helical curve or spiral. The plastic film 16 is wound tightly on the web of VIP 12 and independently around at least one or more of the inner pipes 11 outside the web of VIP 12 and inside of the one or more foamed insulation layers in the form of helical curve for preventing the longitudinal movement of each of the one or more inner pipes 11 with respect to the web of VIP 12 and/or, wherein the insulated pipe 10 comprises two or more inner pipes 11, the plastic film 16 is wound around the two or more inner pipes 11 outside the web of VIP 12 and inside of the one or more foamed insulation layers 13, 14 in the form of helical curve thus arranging the plastic film 16 to surround the two or more inner pipes 11 together for preventing the longitudinal movement of the inner pipes 11 with respect to each other.

The insulating layers 13, 14 are prefabricated insulators in a sheet-like form on a coil 6. From the coil 6, the insulating layers 13, 14 are fed through a wrapping device 6, in which the insulating layers 13, 14 are wrapped around the inner pipes 11. The sides of the insulating layers 13, 14 are joined with a welding device (not shown). The seam formed by the two sides of each of the insulating layers 13, 14 placed against each other is for instance melted closed with hot air in such a manner that the insulating layers 13, 14 completely surround the inner pipes 11. The welding device can also melt the seam closed in some other manner known per se than by utilizing hot air. Instead of the welding device, the sides of the insulating layers 13, 14 can also be joined with a gluing device, for instance.

Figure 2C:
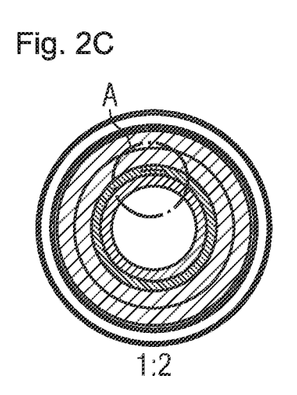
Figure 2D:
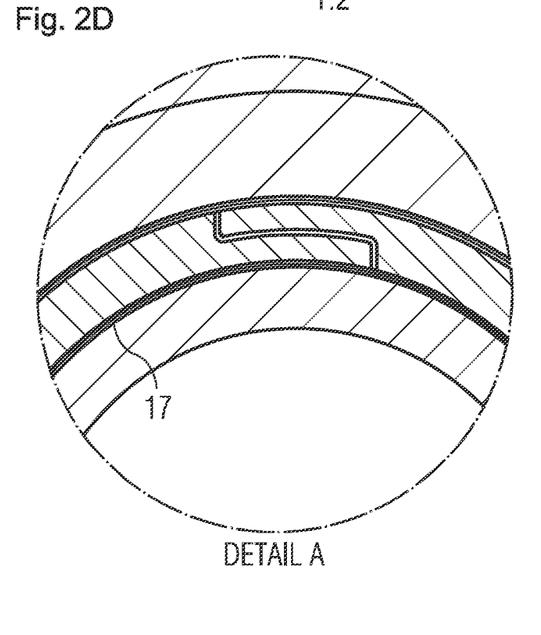
Figure 3A:
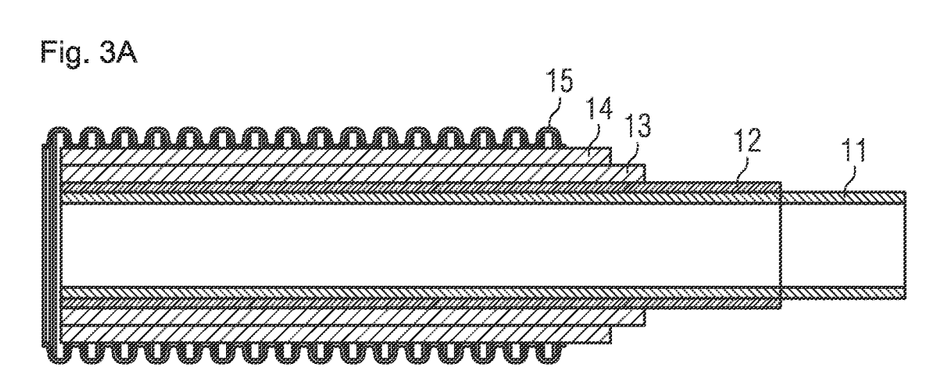
FIGS. 3A, 3B, 3C and 3D show a vacuum unsulated pipe comprising one inner pipe, wherein a longitudinal end of a web of a VIP is secured.
Figure 3B:
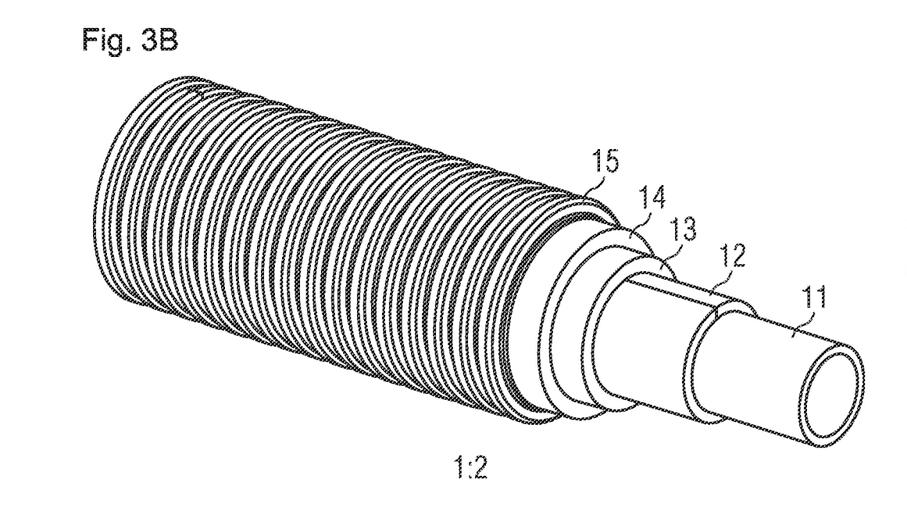
Figure 3C:
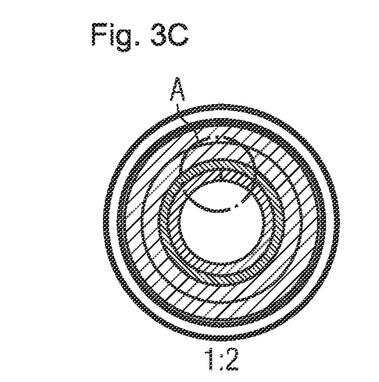
Figure 3D:
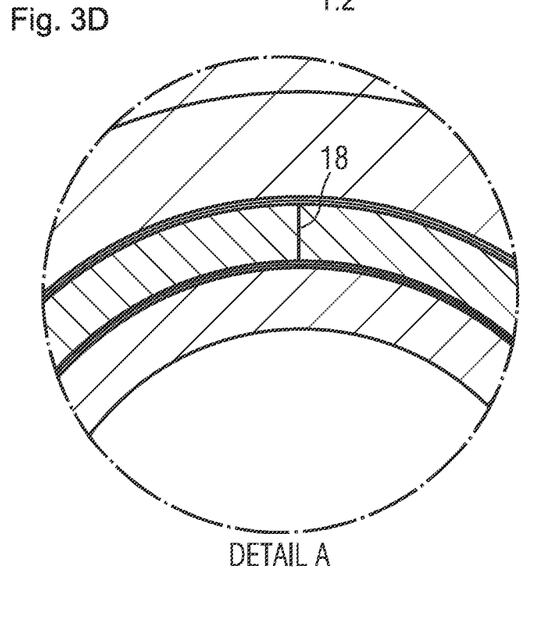
Figure 4A:
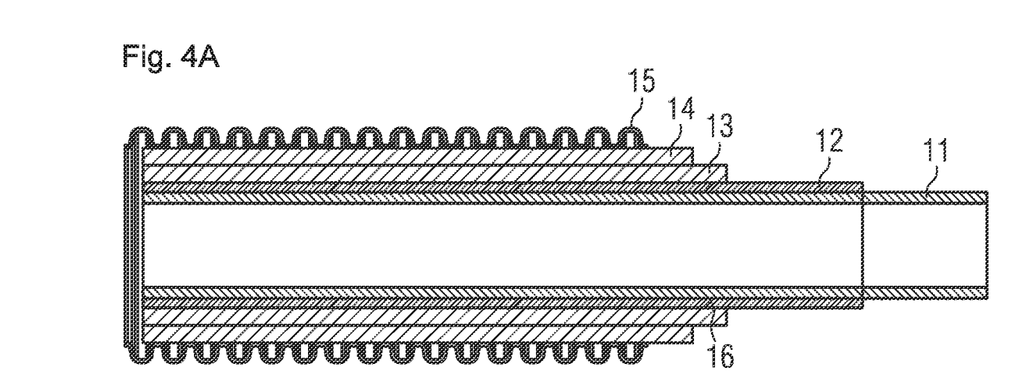
FIGS. 4A, 4B, 4C and 4D show a vacuum unsulated pipe comprising one inner pipe, wherein the longitudinal ends of the web of VIP are secured in different ways.
Figure 4B:
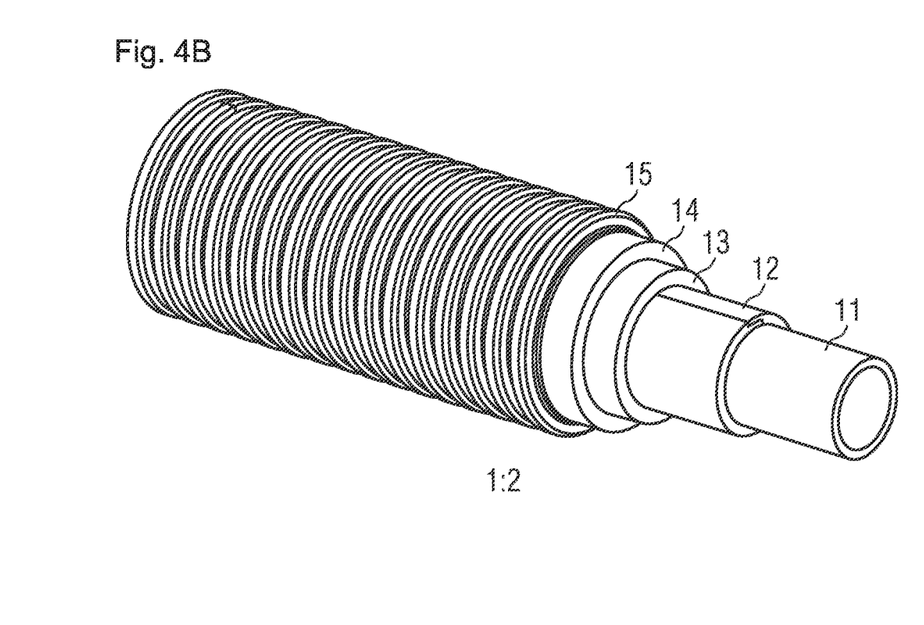
Figure 4C:
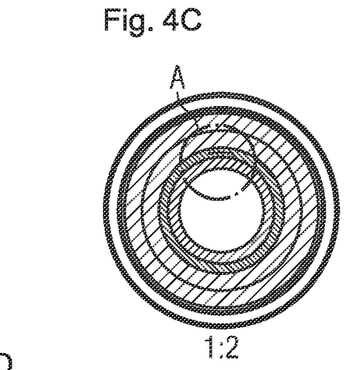
Figure 4D:
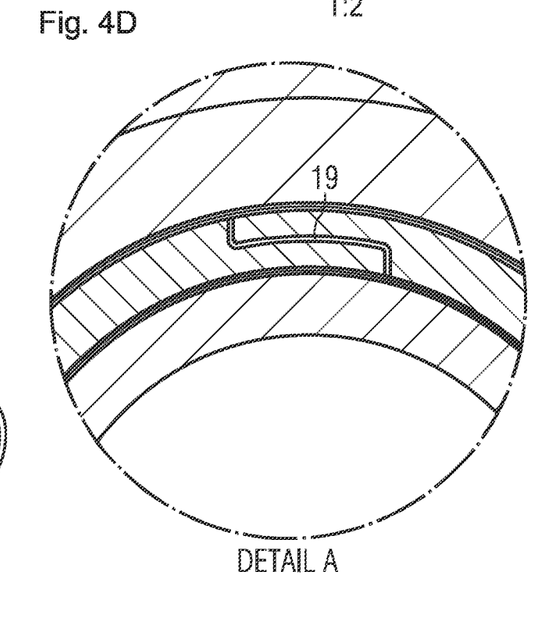
Figures 5A, 5B, 5C, 5D:
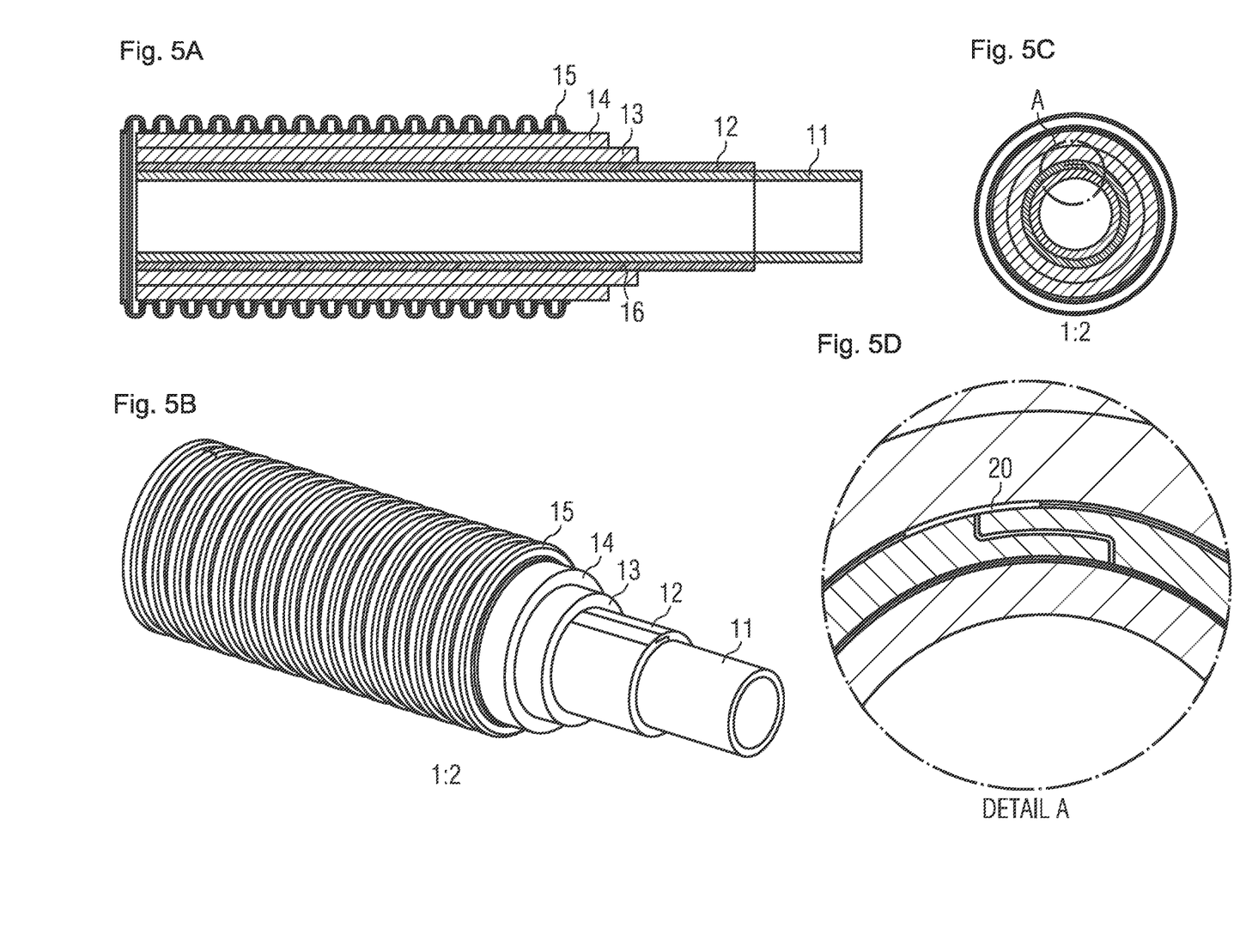
FIGS. 5A, 5B, 5C and 5D show a vacuum unsulated pipe comprising one inner pipe, wherein the longitudinal ends of the web of VIP are secured in different ways.

In addition or alternatively to using a plastic film 16, the web of VIP 12 may be secured to the inner pipe 11. Preferably, this is made by using an adhesive (17) between the inner pipe 11 and the web of VIP (12) (please see FIGS. 2C and 2D) or an adhesive (18, 19) between the longitudinal ends of the web of VIP (please see FIGS. 3C, 3D, 4C, and 4D). FIG. 2C is a vertical sectional view of the piping element 10 showing detail A. FIG. 2D is magnification of detail A showing adhesive (17). It is also possible to use an adhesive tape (20), which can be, for example, applied above the seam outside of the web of VIP (please see FIGS. 5C and 5D).

The inner pipes 11 and the insulating layers 13, 14 wrapped around them are led through the die 8 of an extruder 7. The extruder 7 and die 8 extrude outside the insulating layers 13, 14 a plastic layer, from which the corrugated outer jacket 15 is formed for the insulated pipe 10 in the corrugator 9. The corrugator 9 has two sets of moving chill moulds in a manner known per se. The structure and operation of the extruder 7, die 8 and corrugator 9 are not described in more detail herein, because they are fully known to a person skilled in the art.

As shown in each of FIGS. 2A, 2B, 3A, 3B, 4A, 4B, 5A, and 5B, the insulated pipe 10 has a corrugated outer jacket 15. Inside the outer jacket 15, there are insulating layers 13, 14. Inside the insulating layers 13, 14, there are longitudinal components comprising inner pipe 11 and a web of VIP 12.

The material of the plastic film 16 can be low-density polyethylene PE-LD, for instance, and its thickness 20 μm, for instance. The width of the plastic film 16 can then be 60 to 120 mm, for instance.

In the event of using more than one inner pipe 11 for the insulated pipe 10, the inner pipes 11 may be in the form of a spiral or a helical curve. This winding also in turn helps in that, when the insulated pipe 10 is bent, the inner pipes 11 do not endeavour to move in relation to each other. When manufacturing the insulated pipe 10, the inner pipes 11 can be wound with a separate winding device. Conducted tests show, however, that the inner pipes 11 try to some extent to wind in relation to each other even without any separate winding arrangement. It has been found that this type of self-winding provides a suitable winding in most cases.

The insulating layers 13, 14 may be made of PE, PEX, PP, PUR or aerogel. They are most preferably made of cross-linked closed-cell polyethylene foam. The insulating layers 13, 14 can be formed of one or several prefabricated insulating sheet layers. The thicknesses of the different layers can be the same. Naturally, the width of an outer layer must be greater than that of an inner layer.

The corrugated outer jacket 15 can be made of PE or PP. It is most preferably made of polyethylene PE. Most preferably, the inner pipes 11, insulating layers 13, 14 and outer jacket 15 of the insulated pipe 10 are all made of either cross-linked or conventional polyethylene. For instance, the handling of the insulated pipe 10 during winding is then simple and easy. It is naturally also possible to use other materials. For instance, the insulating layers 13, 14 can also be made of foamed polypropylene. Correspondingly, the outer jacket 15 can also be made of polypropylene.

The outer jacket 15 is preferably corrugated. This enhances the ring stiffness of the insulated pipe 10, for instance 8 to 12 kN/m2. The insulated pipe 10 is especially well suited for underground use. Possible applications are district heating networks and tap water systems, for instance. Due to the optional corrugation, the softness of the insulating layers 13, 14, and the flexibility of the web of VIP, the piping element is bendable. The fact that the insulated pipe 10 is bendable means that the insulated pipe 10 can be coiled for storage and transport and uncoiled for installation. The outer diameter of the insulated pipe 10 can typically be 100 to 300 mm. Piping elements 1 of this kind can be coiled for storage and transport into a coil with a diameter of 0.8 to 3 m, for instance.

The drawing and the related description are intended only to illustrate the idea of the invention. The invention may vary in detail within the scope of the claims. Thus, most preferably, the insulating layer is formed of a prefabricated insulating sheet. The insulator can, however, also be made of a material that is prefabricated into a tube, in which case the tube has a longitudinal slot, through which the longitudinal components, such as inner pipes 11, are installed inside the insulating tube.

The present application further relates to the following items:

Item 1:
An insulated pipe (10) comprising:
one or more inner pipes (11) comprising a plastic
a flexible vacuum insulation panel in the form of units forming a web (12) wrapped around at least one of the one or more inner pipes (11)
one or more insulation layers (13; 14)
an outer jacket (15).

Item 2: The insulated pipe according to one of item 1, wherein the insulated pipe (10) comprises two or more inner pipes (11).

Item 3: The insulated pipe according to item 2, wherein each inner pipe (11) is surrounded by one web of vacuum insulation panels (12).

Item 4: The insulated pipe according to item 2, wherein only one of the inner pipes (11) is surrounded by one web of vacuum insulation panels (12).

Item 5: The insulated pipe according to one of the preceding items, wherein the longitudinal ends of each of the one or more webs of vacuum insulation panels (12) are secured together, preferably by using a method selected from the group consisting of sewing, gluing, laminating, taping, and a combination thereof.

Item 6: The insulated pipe according to one of the preceding items, wherein an adhesive (17, 18, 19) or adhesive tape (20) is arranged over at least the seam part of one side of the web of vacuum insulation panels (12) and the surface of the inner pipe (11) and the web of vacuum insulation panels (12) are joined together by using the (17, 18, 19) or adhesive tape (20).

Item 7: The insulated pipe according to one of the preceding items, further comprising a fastening means made up of plastic film (16) that is wound independently around at least one inner pipe (11) outside the web of flexible vacuum insulation panels (12) and inside of the one or more insulation layers (13, 14) in the form of helical curve for preventing the longitudinal movement of each of the one or more inner pipes (11) with respect to the web of vacuum insulation panels (12).

Item 8: The insulated pipe according to one of the preceding items, wherein the insulated pipe (10) comprises two or more inner pipes and further comprises a fastening means made up of plastic film (16) that is wound around the two or more inner pipes (11) outside the web of flexible vacuum insulation panels (12) and inside of the one or more insulation layers (13, 14) in the form of helical curve and arranged to surround both of the inner pipes together for preventing the longitudinal movement of the inner pipes (11) with respect to each other.

Item 9: A method for manufacturing an insulated pipe according to any one of items 1 to 8, comprising winding plastic film (16), thus producing a fastening means made up of plastic film (16), independently around at least one inner pipe (11) outside the web of flexible vacuum insulation panels (12) and inside of the one or more insulation layers (13, 14) in the form of helical curve for preventing the longitudinal movement of each of the one or more inner pipes with respect to the web of vacuum insulation panels (12) and/or, wherein the insulated pipe comprises two or more inner pipes (11), winding plastic film (16), thus producing a fastening means made up of plastic film (16), around two or more inner pipes (11) outside the web of flexible vacuum insulation panels (12) and inside of the one or more insulation layers (13, 14) in the form of helical curve and arranging plastic film (16) to surround two or more of the inner pipes (11) together for preventing the longitudinal movement of the inner pipes with respect to each other, arranging insulation layers (13, 14) outside the plastic film (16) beneath the outer jacket (15), and forming an outer jacket (15) outside the insulation layers (13, 14).

Item 10: A method as defined in item 9, characterized by forming the one or more insulation layers (13, 14) beneath the outer jacket (15) by wrapping an insulation sheet around the one or more inner pipes (11).

Item 11: An apparatus for manufacturing insulated pipe (10), the apparatus comprising means for feeding longitudinal components, whereby at least one of the longitudinal components is an inner pipe (11) and one of the longitudinal components is a web of flexible vacuum insulation panels (12), which is arranged around one or more of the at least one inner pipe (11), means (6) for arranging one or more foamed insulation layers (13, 14) outside the longitudinal components, an extruder (7) and a corrugator (9) for forming an outer jacket (15) outside the one or more insulation layers (13, 14), and means (5) for arranging fastening means made up of plastic film (16) in the form of helical curve to the longitudinal components to touch each of the longitudinal components in such a manner that the fastening means prevent the longitudinal movement of the longitudinal components with respect to each other.

Item 12: An apparatus as defined in item 11, characterized in that the apparatus comprises a winding device (5) for winding plastic film (16) in the form of a helical curve independently around at least one inner pipe (11) outside the web of flexible vacuum insulation panels (12) and inside of the one or more foamed insulation layers (13, 14) in the form of helical curve for preventing the longitudinal movement of each of the one or more inner pipes (11) with respect to the web of flexible vacuum insulation panels (12) and/or, wherein the insulated pipe (10) comprises two or more inner pipes (11), winding plastic film (16), thus producing a fastening means made up of plastic film (16) around two or more inner pipes (11) outside the web of flexible vacuum insulation panels (12) and inside of the one or more foamed insulation layers (13, 14) in the form of helical curve and arranging plastic film (16) to surround two or more of the inner pipes (11) together for preventing the longitudinal movement of the inner pipes (11) with respect to each other.

Item 13: An apparatus as defined in item 11 or 12, characterized in that the apparatus comprises means (6) for arranging a prefabricated insulation layers (13, 14) around the longitudinal components.

Item 14: An apparatus as defined in item 13, characterized in that the apparatus comprises a wrapping device (6) for wrapping a prefabricated insulation layers (13, 14) around the one or more inner pipes (11).

LIST OF REFERENCE NUMBERS

1 Inner pipe is fed to the line
2 Web of VIP is fed to the line
3 Web of VIP is wound over the inner pipe
4 The longitudinal ends of the web of VIP are secured together
5 Foil is wound over the web of VIP
6 Insulation layers are fed to the line
7 Extruder plastifies material for outer jacket
8 Die extrudes outer layer
9 Corrugator creates the form of outer layer
10 Insulated pipe
11 Inner pipe
12 Web of VIP
13, 14 Insulation layers
15 Outer jacket
16 Foil
17, 18, 19 Adhesive
20 Adhesive tape

The invention claimed is:
1. An insulated pipe comprising:
one or more inner pipes comprising a plastic;
a flexible vacuum insulation panel comprising individual vacuum insulation panels joined to each other wrapped around at least one inner pipe of the one or more inner pipes:
one or more insulation layers; and
an outer jacket,
wherein an adhesive or adhesive tape is arranged over at least a seam part of one side of an individual vacuum insulation panel of the individual vacuum insulation panels.

2. The insulated pipe according to claim 1, wherein the insulated pipe comprises two or more inner pipes.

3. The insulated pipe according to claim 2, wherein each inner pipe of the two or more inner pipes is surrounded by the individual vacuum insulation panels.

4. The insulated pipe according to claim 2, wherein only one inner pipe of the two or more inner pipes is surrounded by the individual vacuum insulation panels.

5. The insulated pipe according to claim 1, wherein longitudinal ends of each of the individual vacuum insulation panels are secured together by using at least one of sewing, gluing, laminating and taping.

6. The insulated pipe according to claim 1,
wherein a surface of an inner pipe of the one or more inner pipes and the individual vacuum insulation panels are joined together by using the adhesive or adhesive tape.

7. The insulated pipe according to claim 1, further comprising a fastening means comprising plastic film that is wound (i) independently around at least one inner pipe, of the one or more inner pipes, (ii) outside the individual vacuum insulation panels and (iii) inside of the one or more insulation layers, in a form of a helical curve for preventing longitudinal movement of each inner pipe of the one or more inner pipes with respect to the individual vacuum insulation panels.

8. The insulated pipe according to claim 1, wherein the insulated pipe comprises:
two or more inner pipes; and
a fastening means comprising plastic film that is wound (i) around the two or more inner pipes, (ii) outside the individual vacuum insulation panels and (iii) inside of the one or more insulation layers, in a form of a helical curve and arranged to surround both inner pipes of the two or more inner pipes together for preventing longitudinal movement of the two or more inner pipes with respect to each other.

9. A method for manufacturing an insulated pipe comprising (i) one or more insulation layers, (ii) two or more inner pipes, and (ii) a fastening means comprising plastic film wound (a) around the two or more inner pipes, (b) outside flexible vacuum insulation panels, and (c) inside of the one or more insulation layers in a form of a helical curve, the method comprising:
winding the plastic film (i) independently around at least one inner pipe of the two or more inner pipes, (ii) outside the flexible vacuum insulation panels, and (iii) inside of the one or more insulation layers in the form of the helical curve for preventing longitudinal movement of each inner pipe of the one or more inner pipes with respect to the flexible vacuum insulation panels;
arranging the one or more insulation layers outside the plastic film and beneath an outer jacket formed outside the one or more insulation layers; and
arranging an adhesive or adhesive tape over at least a seam part of one side of an individual vacuum insulation panel of the individual vacuum insulation panels.

10. The method of claim 9, further comprising forming the one or more insulation layers beneath the outer jacket by wrapping an insulation sheet around the one or more inner pipes.

11. An apparatus for manufacturing an insulated pipe, the apparatus comprising:
- means for feeding longitudinal components, whereby at least one of the longitudinal components is an inner pipe and one of the longitudinal components is a flexible vacuum insulation panel, including individual vacuum insulation panels, which is arranged around the inner pipe;
- means for arranging one or more foamed insulation layers outside the longitudinal components;
- an extruder and a corrugator for forming an outer jacket outside the one or more foamed insulation layers; and
- means for arranging fastening means made up of plastic film in a form of a helical curve to the longitudinal components to touch each of the longitudinal components in such a manner that the fastening means prevent longitudinal movement of the longitudinal components with respect to each other,
- means for arranging an adhesive or adhesive tape over at least a seam part of one side of an individual vacuum insulation panel of the individual vacuum insulation panels.

12. The apparatus of claim 11, further comprising:
- a winding device for winding the plastic film in the form of the helical curve (i) independently around the inner pipe, (ii) outside the flexible vacuum insulation panel, and (iii) inside of the one or more foamed insulation layers, in the form of the helical curve for preventing the longitudinal movement of the inner pipe with respect to the flexible vacuum insulation panel,
- wherein the insulated pipe comprises:
  - two or more inner pipes; and
  - wound plastic film, thus producing a fastening means made up of the plastic film (i) around the two or more inner pipes, (ii) outside the flexible vacuum insulation panel, and (iii) inside of the one or more foamed insulation layers in the form of the helical curve, and
- wherein the plastic film is arranged to surround two or more of the inner pipes together for preventing the longitudinal movement of the inner pipes with respect to each other.

13. The apparatus of claim 11, further comprising means for arranging a prefabricated insulation layer around the longitudinal components.

14. The apparatus of claim 13, further comprising a wrapping device for wrapping a prefabricated insulation layer around the one or more inner pipe.

* * * * *